(12) United States Patent
Kim et al.

(10) Patent No.: US 11,371,729 B2
(45) Date of Patent: Jun. 28, 2022

(54) RADIATION SHIELDING DEVICE FOR METEOROLOGICAL OBSERVATION WITH INTERNAL AIR CIRCULATION

(71) Applicant: National Institute of Meteorological Sciences, Seogwipo-si (KR)

(72) Inventors: Geon Tae Kim, Gangneung-si (KR); Seon Jeong Kim, Gangneung-si (KR); Ka Woong Kang, Gwangju (KR); Mi Eun Park, Gangneung-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 17/474,655

(22) Filed: Sep. 14, 2021

(65) Prior Publication Data

US 2022/0107101 A1 Apr. 7, 2022

(30) Foreign Application Priority Data

Oct. 6, 2020 (KR) .......................... 10-2020-0129047

(51) Int. Cl.
*F24F 7/06* (2006.01)
*G01W 1/02* (2006.01)
*G01W 1/11* (2006.01)
*G21F 3/00* (2006.01)

(52) U.S. Cl.
CPC ................. *F24F 7/06* (2013.01); *G01W 1/02* (2013.01); *G01W 1/11* (2013.01); *G21F 3/00* (2013.01)

(58) Field of Classification Search
CPC .............. G01W 1/02; G01W 1/11; F24F 7/06

USPC ......................................................... 454/251
See application file for complete search history.

(56) References Cited

FOREIGN PATENT DOCUMENTS

| JP | 2004301805 A | | 10/2004 |
|---|---|---|---|
| KR | 2019870005128 U | | 4/1987 |
| KR | 1020110023664 A | | 3/2011 |
| KR | 101245601 B1 | | 3/2013 |
| KR | 101767737 B1 | * | 8/2017 |
| KR | 101767737 B1 | | 8/2017 |
| KR | 200484803 Y1 | | 10/2017 |
| KR | 101865613 B1 | * | 6/2018 |
| KR | 101865613 B1 | | 6/2018 |

* cited by examiner

*Primary Examiner* — Allen R. B. Schult
(74) *Attorney, Agent, or Firm* — David R. Stevens; Stevens Law Group

(57) ABSTRACT

A radiation shielding device for meteorological observation with internal air circulation including: a body for allowing meteorological sensors to be mounted therein; a cover for covering the body by engaging with the body; and a modified Venturi tube which is physically formed while the body and the cover are engaged with each other; wherein, the modified Venturi tube is configured as a first opening for receiving external air from an exterior of the body, a second opening for receiving internal air from an interior of the body, and a third opening for releasing the received external air and the received internal air, and wherein, the external air gets into the modified Venturi tube through the first opening, the internal air gets into the modified Venturi tube through the second opening, and the external air and the internal air are released from the modified Venturi tube through the third opening.

3 Claims, 3 Drawing Sheets

RADIATION SHIELDING DEVICE FOR METEOROLOGICAL OBSERVATION WITH INTERNAL AIR CIRCULATION

CROSS REFERENCE TO RELATED APPLICATION

This application claims the benefit of foreign priority to Korean Application 10-2020-0129047 filed Oct. 6, 2020, the entire contents of which being incorporated herein by reference.

FIELD OF THE DISCLOSURE

The present disclosure relates to a radiation shielding device for meteorological observation with internal air circulation; and more particularly, to the radiation shielding device for meteorological observation capable of circulating the internal air by using a modified Venturi tube.

BACKGROUND OF THE DISCLOSURE

A range of measurement a meteorological instrument can measure is physically limited, therefore, voids where meteorological observations are not made are inevitable. Further, it is currently unrealistic to install such meteorological instruments to all of such voids.

Therefore, a method and a device for mounting the meteorological instrument onto a moving body, such as a vehicle, to allow measuring while travelling to various measuring sites as needed were introduced.

Herein, the meteorological instrument may be installed within a radiation shielding device in order to block direct sunlight. Additionally, internal air of the radiation shielding device should be circulated to accurately measure a temperature and a humidity. Therefore, the radiation shielding device has an aspirating fan installed therein to circulate the internal air therein.

However, when a vehicle with the radiation shielding device mounted thereon is moving, it may cause damages frequently because the aspirating fan might run reversely or run excessively and it might result in the overload of a motor of the aspirating fan.

For example, FIG. 1 is a drawing of a conventional radiation shielding device for meteorological observation with an aspirating fan and a motor.

As shown in FIG. 1, the conventional radiation shielding device for meteorological observation includes an aspirating fan 10 and the motor for driving the aspirating fan 10. When such conventional radiation shielding device mounted on a vehicle is moved along with the vehicle, the aspirating fan 10 might run reversely or run excessively, causing the motor to overload. If the motor is overloaded, the motor might be damaged and the aspirating fan 10 will no longer be able to run, thus, the internal air of the conventional radiation shielding device cannot be circulated.

Therefore, there is a need of a method or a device for circulating the internal air without the motor when the radiation shielding device mounted on the vehicle is moved along with the vehicle.

SUMMARY OF THE DISCLOSURE

It is an object of the present disclosure to solve all the aforementioned problems.

It is another object of the present disclosure to circulate internal air of a radiation shielding device mounted on a vehicle while moving without an additional component such as an aspirating fan or a motor.

It is still another object of the present disclosure to minimize a difference between the internal air and external air of the radiation shielding device mounted on the vehicle while moving by allowing the internal air to be circulated automatically.

In order to accomplish the objects above, distinctive structures of the present disclosure are described as follows.

In accordance with one aspect of the present disclosure, there is provided a radiation shielding device for meteorological observation with internal air circulation including: a body for allowing one or more meteorological sensors to be mounted therein; a cover for covering the body by engaging with the body; and a modified Venturi tube which is physically formed while the body and the cover are engaged with each other; wherein, while the body and the cover are engaged with each other, the modified Venturi tube is configured as a first opening for receiving external air from an exterior of the body, a second opening for receiving internal air from an interior of the body, and a third opening for releasing the received external air and the received internal air, and wherein a size of a cross-section of the first opening and a size of a cross-section of the third opening are increased along directions from a central portion of the modified Venturi tube to both ends of the modified Venturi tube, and wherein the modified Venturi tube performs a function of a conventional Venturi tube by using the first opening and the third opening, and allows the internal air in the interior of the body to flow into the modified Venturi tube through the second opening, and wherein, wherein, the first opening, the second opening and the third opening are configured such that, while a vehicle on which the radiation shielding device is mounted is moved, the external air gets into the modified Venturi tube through the first opening, the internal air gets into the modified Venturi tube through the second opening, and the external air and the internal air are released from the modified Venturi tube through the third opening to thereby allow the internal air therein to be circulated.

As one example, an internal supporting structure for allowing the one or more meteorological sensors to be mounted is installed on a predetermined portion within the body, and wherein the one or more meteorological sensors are mounted on the internal supporting structure.

As one example, the body and the cover are engaged with each other by using a first fastening mechanism formed on the body and a second fastening mechanism formed on the cover, and wherein a minimum size of the cross-section of the first opening and a minimum size of the cross-section of the third opening are adjusted to be equal to or less than a predetermined threshold by controlling the first fastening mechanism and the second fastening mechanism while the first fastening mechanism and the second fastening mechanism are in alignment.

As one example, a fourth opening is formed on a bottom portion of the body, to allow the internal air to be circulated according to (i) a first airflow vector including a 1-1 sub-vector representing that the external air is received by the bottom portion of the body through the fourth opening, a 1-2 sub-vector representing that the received external air is transmitted to the central portion of the modified Venturi tube via the second opening and a 1-3 sub-vector representing that the transmitted external air is released through the third opening, which is much facilitated by an aid of (ii) a second airflow vector including a 2-1 sub-vector representing that the external air is received through the first opening and a 2-2 sub-vector representing that the received external air is released through the third opening to be added together, to thereby promote the internal air circulation of the body.

As one example, any cross-sectional sizes of the first opening, the second opening, and the third opening are controlled to be increased or decreased to adjust an intensity of an airflow in the body by referring to a total vector, which is obtained by adding the first airflow vector and the second airflow vector.

BRIEF DESCRIPTION OF THE DRAWINGS

The above and other objects and features of the present disclosure will become apparent from the following description of preferred embodiments given in conjunction with the accompanying drawings. The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
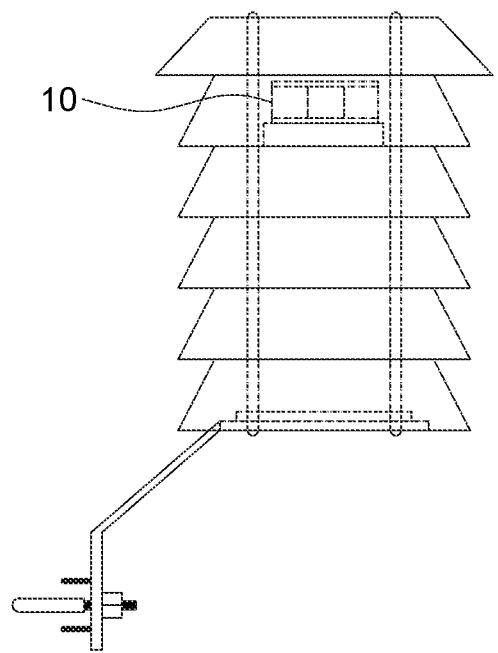
FIG. 1 is a drawing illustrating a conventional radiation shielding device for meteorological observation with an aspirating fan and a motor.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects. As used in this specification and the appended claims, the singular forms "a," "an," and "the" include plural referents unless the content and context clearly dictates otherwise.

To allow those skilled in the art to carry out the present disclosure easily, the example embodiments of the present disclosure by referring to attached diagrams will be explained in detail as shown below.

A radiation shielding device for meteorological observation in which internal air thereof is circulated in accordance with one example embodiment of the present disclosure will be described in detail with reference to FIG. 2 as below.

Figure 2:
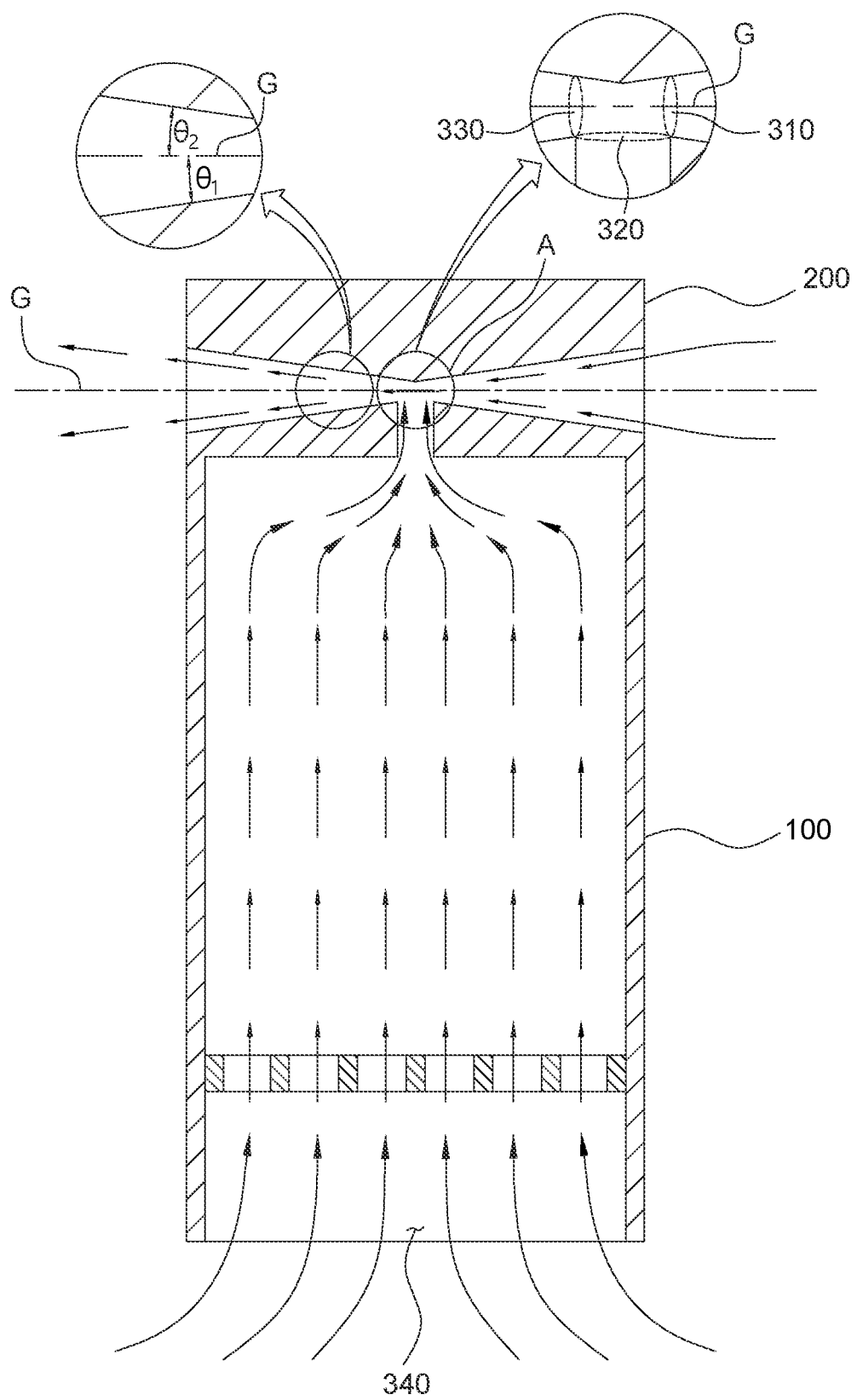
FIG. 2 illustrates a cross-sectional view of a radiation shielding device for meteorological observation with internal air circulation in accordance with one example embodiment of the present disclosure.

FIG. 2 illustrates a cross-sectional view of the radiation shielding device for meteorological observation with the internal air circulation in accordance with one example embodiment of the present disclosure.

As illustrated in FIG. 2, the radiation shielding device for meteorological observation includes a body 100, cover 200, and a modified Venturi tube A formed due to a structure of the body 100 and the cover 200 being combined.

A top surface of a cross-section of the body 100 is shaped as slopes formed downward of at least a first angle (i.e. $\theta 1$) with respect to a plane G parallel to a ground, a bottom surface of a cross-section of the cover 200 is shaped as slopes formed upward of at least a second angle (i.e. $\theta 2$) with respect to the plane G parallel to the ground, and a modified Venturi tube A is physically formed when the body 100 and the cover 200 are engaged with each other due to a combined angle (i.e. a sum of the first angle and the second angle) formed between the top surface of the body 100 and the bottom surface of the cover 200.

As one example, the top surface of the cross-section of the body 100 has slopes of 5 degrees with respect to the plane G parallel to the ground, and the bottom surface of the cross-section of the cover 200 has slopes of 10 degrees with respect to the plane G parallel to the ground. The modified Venturi tube A is then physically formed by the combined angle of 15 degrees when the body 100 and the cover 200 are engaged with each other. Herein, the top surface of the body 100 constitutes one part of the modified Venturi tube A while the bottom surface of the cover 200 constitutes the other part of the modified Venturi tube A.

Further, inner corners of the body 100 may be rounded to facilitate a flow of the internal air.

While the body 100 and the cover 200 are engaged with each other, the modified Venturi tube A is configured as a first opening 310 for receiving external air from an exterior of the body 100, a second opening 320 for receiving internal air from an interior of the body, and a third opening 330 for releasing the received external air and the received internal air, and while a vehicle on which the radiation shielding device is mounted is moved, the external air gets into the modified Venturi tube A through the first opening 310, the internal air gets into the modified Venturi tube A through the second opening 320, and the received external air and the received internal air are released from the modified Venturi tube A through the third opening 330 to thereby allow the internal air therein to be circulated.

For example, the first opening 310 and the third opening 330 are formed at both ends of the modified Venturi tube A, and the second opening 320 is formed to allow the interior of the body 100 to be connected to the modified Venturi tube A. The cross-sectional shapes of the first opening 310, the second opening 320, and the third opening 330 may be circles, but they are not limited thereto. Herein, while the body 100 and the cover 200 are engaged with each other, the internal air may be received through the second opening 320 and released through the third opening 330 due to the Venturi effect caused by a section of low pressure formed at a narrow gap between the top surface of the body 100 and the bottom surface of the cover 200.

Although not illustrated, as another example, the top surface of the body 100 may be shaped with (i) a (1_1)-st portion having a slope formed downward of a (1_1)-st angle with respect to the plane G parallel to the ground and (ii) a (1_2)-nd portion having a slope formed downward of a (1_2)-nd angle with respect to the plane G parallel to the ground.

Simply put, the slope of the (1_1)-st portion of the top surface of the body 100 and the slope of the (1_2)-nd portion of the top surface of the body 100 can be different. As an example, the (1_1)-st angle may be 5 degrees, and the (1_2)-nd angle may be 3 degrees. In this case, an upper vertex of the top surface may be formed so that it is located at a center of the top surface or more toward the (1_1)-st portion or the (1_2)-nd portion.

Further, the bottom surface of the cover 200 may be shaped with (i) a (2_1)-st portion having a slope formed upward of a (2-1)-st angle with respect to the plane G parallel to the ground and (ii) a (2_2)-nd portion having a slope formed upward of a (2_2)-nd angle with respect to the plane G parallel to the ground. Herein, each of the (2_1)-st portion and the (2_2)-nd portion can be extended until a lower vertex of the bottom surface or a point equivalent thereto.

As an example, the (2-1)-st angle may be 5 degrees, and the (2-2)-nd angle may be 3 degrees. In this case, the lower vertex of the bottom surface may be formed so that it is located at a center of the bottom surface or more toward the (2_1)-st portion or the (2_2)-nd portion.

As still another example, the top surface of the body 100 may not be a slope in a uniform angle. Herein, when viewing a cross-section of the body 100 generated by using an imaginary cutting plane (which is perpendicular to the ground and passes through a center of the body 100), some portions corresponding to the top surface of the body 100 may be curved, and the first angle (i.e. $\theta 1$) may be an angle between a tangent line passing through the upper vertex or a point equivalent thereto of the top surface of the body 100 and the plane G parallel to the ground.

Furthermore, the bottom surface of the cover 200 may not be a slope in a uniform angle. Herein, when viewing a cross-section of the cover 200 generated by using the imaginary cutting plane (which is perpendicular to the ground and passes through a center of the cover 200), some portions corresponding to the bottom surface of the cover 200 may be curved, and the second angle (i.e. $\theta 2$) may be an angle between a tangent line passing through the lower vertex or a point equivalent thereto of the bottom surface of the cover 200 and the plane G parallel to the ground.

Next, a configuration of mounting one or more meteorological sensors 400 in the radiation shielding device for meteorological observation with internal air circulation will be described with reference to FIG. 3.

Figure 3:
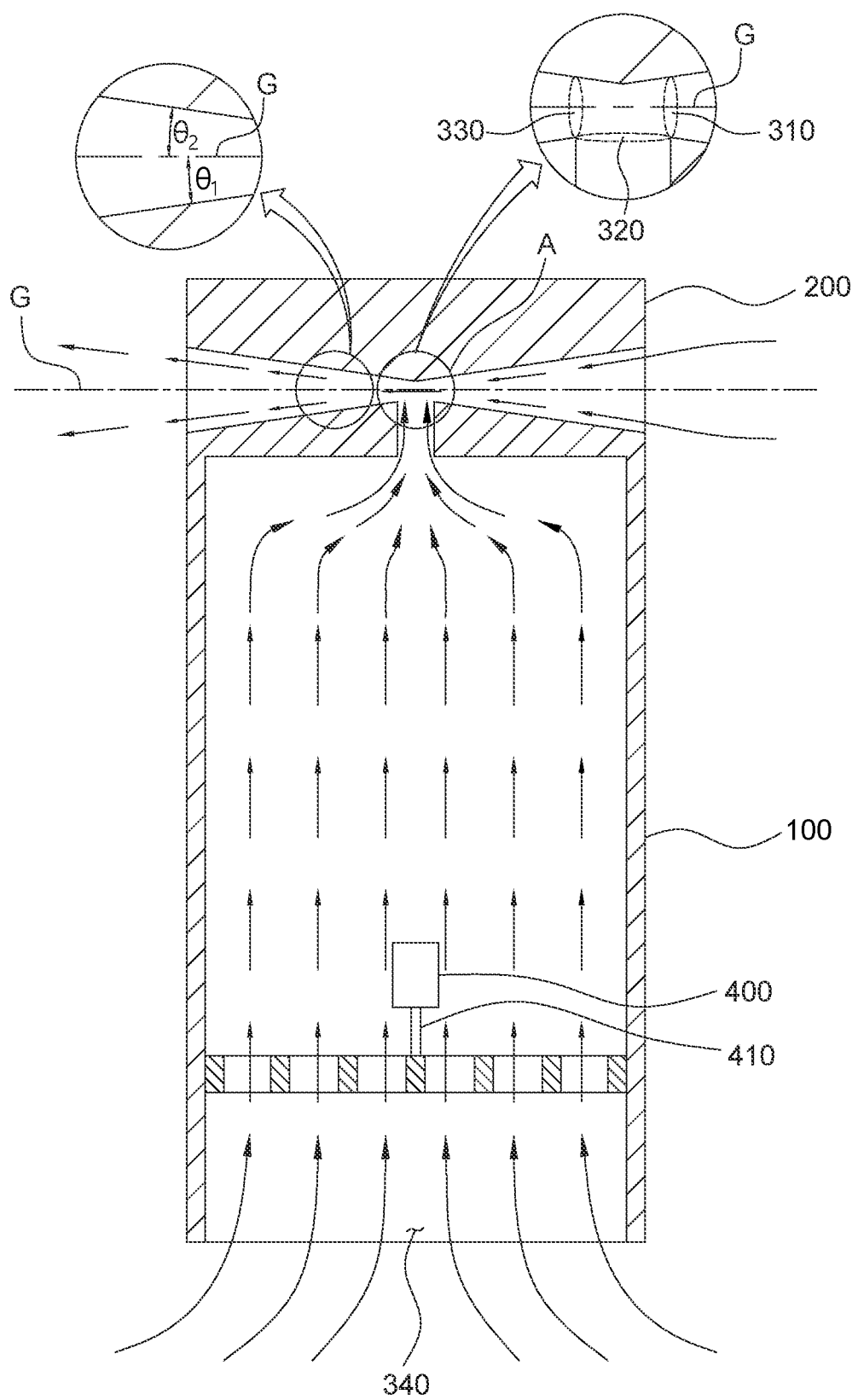
FIG. 3 illustrates a cross-sectional view of one or more meteorological sensors mounted inside the radiation shielding device with internal air circulation.

FIG. 3 illustrates a cross-sectional view of the one or more meteorological sensors mounted inside the radiation shielding device for meteorological observation with internal air circulation.

As illustrated in FIG. 3, there may be an internal supporting structure 410, installed on a predetermined portion within the body 100, for allowing the one or more meteorological sensors 400 to be mounted. Herein, the one or more meteorological sensors 400 may be mounted onto the internal supporting structure 410. The one or more meteorological sensors 400 may include a thermometer and a hygrometer, but they are not limited thereto.

The internal supporting structure 410 may be of stainless steel, aluminum alloy, etc. in order to withstand a weight of the one or more meteorological sensors 400, but it is not limited thereto. Further, although a fourth opening 340 is illustrated as a porous structure to allow the interior of the body 100 to receive the external air therethrough in FIG. 3, a structure of the fourth opening 340 may be in any form to facilitate receiving the external air.

Next a configuration of engaging the body 100 and the cover 200 will be explained.

A first fastening mechanism (not illustrated) may be formed on the top surface of the body 100 and a second fastening mechanism (not illustrated) may be formed on the bottom surface of the cover 200. While the first fastening mechanism and the second fastening mechanism are in alignment, a minimum size of the cross-section of the first opening 310 and a minimum size of the cross-section of the third opening 330 are adjustable to be equal to or less than a predetermined threshold by controlling an engaged state of the first fastening mechanism and the second fastening mechanism.

As an example, the first fastening mechanism may have depressions of a certain first shape and the second fastening mechanism may have projections of a certain second shape to accommodate the depressions, to thereby allow the engagement of the first fastening mechanism and the second fastening mechanism, but they are not limited thereto, and may implement other fastening mechanisms such as nuts and bolts to engage the first fastening mechanism and the second fastening mechanism with each other while the first fastening mechanism and the second fastening mechanism are in alignment.

Moreover, there may be the fourth opening 340 formed on the bottom portion of the body 100 to allow the internal air to be circulated according to (i) a first airflow vector including a 1-1 sub-vector representing that the external air is received by the bottom portion of the body 100 through the fourth opening 340, a 1-2 sub-vector representing that the received external air is transmitted to a central portion of the modified Venturi tube A via the second opening 320 and a 1-3 sub-vector representing that the transmitted external air is released through the third opening 330, which is much facilitated by an aid of (ii) a second airflow vector including a 2-1 sub-vector representing that the external air is received through the first opening 310 and a 2-2 sub-vector representing that the received external air is released through the third opening 330 to be added together, to thereby promote the internal air circulation of the body 100.

Additionally, the radiation shielding device of the present disclosure may include a controlling unit (not illustrated) for controlling any cross-sectional sizes of the first opening 310, the second opening 320, and the third opening 330 to be increased or decreased by referring to a total vector, which is obtained by adding the first airflow vector and the second airflow vector, to thereby adjust an intensity of an airflow in the body 100.

As one example, there may be diaphragms installed on at least part of the first opening 310, the second opening 320, and the third opening 330, and there may be an airflow sensor, capable of detecting a magnitude of the total vector, installed in the third opening 330. Herein, the airflow sensor may transmit the detected total vector to the control unit, and the control unit may control apertures of at least part of the first opening 310, the second opening 320, and the third opening 330 to adjust at least part of the cross-sectional sizes of the first opening 310, the second opening 320, and the third opening 330, to thereby control the total vector.

The present disclosure has an effect of circulating the internal air of the radiation shielding device without an additional component such as the aspirating fan 10 or the motor.

The present disclosure has another effect of minimizing a difference between the internal air and the external air of the radiation shielding device by allowing the internal air to be circulated automatically.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A radiation shielding device, mounted on a vehicle, for meteorological observation with internal air circulation, the radiation shielding device comprising:
    a body for allowing one or more meteorological sensors to be mounted therein;
    a cover for covering the body by engaging with the body; and
    a modified Venturi tube which is physically formed while the body and the cover are engaged with each other;
    wherein, while the body and the cover are engaged with each other, the modified Venturi tube is configured as a first opening for receiving external air from an exterior of the body, a second opening for receiving internal air from an interior of the body, and a third opening for releasing the received external air and the received internal air, and
    wherein a size of a cross-section of the first opening and a size of a cross-section of the third opening are increased along directions from a central portion of the modified Venturi tube to both ends of the modified Venturi tube, and
    wherein the modified Venturi tube performs a function of a conventional Venturi tube by using the first opening and the third opening, and allows the internal air in the interior of the body to flow into the modified Venturi tube through the second opening, and
    wherein, the first opening, the second opening and the third opening are configured such that, while the vehicle on which the radiation shielding device is mounted is moved, the external air gets into the modified Venturi tube through the first opening, the internal air gets into the modified Venturi tube through the second opening, and the external air and the internal air are released from the modified Venturi tube through the third opening to thereby allow the internal air therein to be circulated, and
    wherein a fourth opening is formed on a bottom portion of the body, to allow the internal air to be circulated according to (i) a first airflow vector including a 1-1 sub-vector representing that the external air is received by the bottom portion of the body through the fourth opening, a 1-2 sub-vector representing that the received external air is transmitted to the central portion of the modified Venturi tube via the second opening and a 1-3 sub-vector representing that the transmitted external air is released through the third opening, which is much facilitated by an aid of (ii) a second airflow vector including a 2-1 sub-vector representing that the external air is received through the first opening and a 2-2 sub-vector representing that the received external air is released through the third opening to be added together, to thereby promote the internal air circulation of the body, and
    wherein each of the size of the cross section of the first opening, the size of the cross section of the second opening, and a size of a cross section of the third opening is controlled to be increased or decreased to adjust an intensity of an airflow in the body by referring to a total vector, which is obtained by adding the first airflow vector and the second airflow vector.

2. The radiation shielding device of claim 1, wherein an internal supporting structure for allowing the one or more meteorological sensors to be mounted is installed on a predetermined portion within the body, and
    wherein the one or more meteorological sensors are mounted on the internal supporting structure.

3. The radiation shielding device of claim 1, wherein the body and the cover are engaged with each other by using a first fastening mechanism formed on the body and a second fastening mechanism formed on the cover, and wherein a minimum size of the cross-section of the first opening and a minimum size of the cross-section of the third opening are adjusted to be equal to or less than a predetermined threshold by controlling the first fastening mechanism and the second fastening mechanism while the first fastening mechanism and the second fastening mechanism are in alignment.

* * * * *